United States Patent
Mattucci et al.

[15] 3,668,227
[45] June 6, 1972

[54] MOLYBDENUM CATALYSTS FOR THE OXIDATION OF UNSATURATED COMPOUNDS IN LIQUID PHASE

[72] Inventors: Anna Maria Mattucci, Torino; Emilio Perrotti, San Donato Milanese, both of Italy

[73] Assignee: Snam Progetti S.p.A., Milan, Italy

[22] Filed: Sept. 5, 1969

[21] Appl. No.: 855,739

[30] Foreign Application Priority Data

Sept. 5, 1968    Italy..................................20871 A/68

[52] U.S. Cl.....................................260/429 J, 260/348.5 R
[51] Int. Cl..........................................C07f 11/00, C07d 1/08
[58] Field of Search.................................260/429

[56] References Cited

UNITED STATES PATENTS

| | | | |
|---|---|---|---|
| 2,795,552 | 6/1957 | Abbott et al. | 252/49.7 |
| 3,121,059 | 2/1964 | DeYoung et al. | 252/42.7 |
| 3,285,942 | 11/1966 | Price et al. | 260/429 |

FOREIGN PATENTS OR APPLICATIONS 1,022,205    1/1958    Germany

OTHER PUBLICATIONS

Flaschka et al., Chelates in Analytical Chemistry, Marcel Dekker, Inc. New York, New York, 1967, pp. 274–280.
Richardson J. Inorg. Nucl. Chem., 1959, Vol. 9, pp. 273–278
Larson et al. Inorg. Chem. 1 (1962) pp. 856–857

*Primary Examiner*—James E. Poer
*Assistant Examiner*—A. P. Demers
*Attorney*—Ralph M. Watson

[57] ABSTRACT

A molybdenum alkylene-dioxy-derivative, adapted to catalyze the oxidation of certain compounds containing ethylenic unsaturations, is prepared by reacting an organic molybdenum compound in which oxygen atoms are directly attached to the molybdenum atom with an organic derivative having vicinal hydroxyl groups.

7 Claims, No Drawings

MOLYBDENUM CATALYSTS FOR THE OXIDATION OF UNSATURATED COMPOUNDS IN LIQUID PHASE

This invention relates to molybdenum derivatives suitable for use as catalysts in the oxidation of certain compounds containing ethylenic unsaturations.

According to one aspect of the present invention there is provided an organo-molybdenum compound represented by one of the following general formulas:

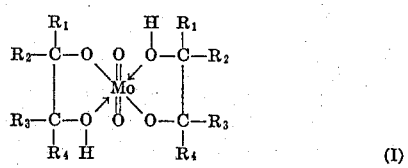

and

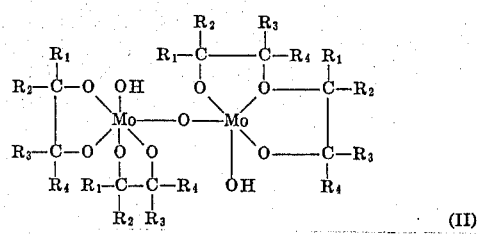

wherein each of $R_1$, $R_2$, $R_3$ and $R_4$, which may be the same or different, is a hydrogen atom, an unsubstituted or substituted hydrocarbon radical having from one to 10 carbon atoms, or a group having one of the formulas

and $-NO_2$, where R is a hydrocarbon radical having from one to 10 carbon atoms, or where $R_1$ and $R_4$, and/or $R_2$ and $R_3$ may form a bivalent hydrocarbon radical.

The molybdenum compound of the present invention is suitable for use as a catalyst capable of catalyzing the oxygen transfer in a homogeneous phase from, for example, a peroxy compound of the type R—OOH, wherein R = alkyl, cycloalkyl, aryl, aralkyl or acyl, to an unsaturated compound of the type having the general formula:

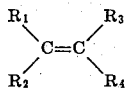

wherein each of $R_1$, $R_2$, $R_3$ and $R_4$, which may be the same or different, may be a hydrogen atom, an alkyl group having from one to eight carbon atoms, or an aryl, alkaryl, cycloalkyl, hydroxyalkyl or cyano-alkyl group, so as to give the corresponding epoxides.

The compounds of the present invention may also be employed in the synthesis of the hydroxy-hydroperoxides described and claimed in the specification of our co-pending application, Ser. No. 855,738, filed of even date herewith.

As oxidation catalysts the compounds of the present invention have an effectiveness regarding kinetics and yields, which is generally higher than known catalysts. The monomer type products (I) are colorless, whereas the dimer products (II) are yellow and identifiable in the I.R. spectrum by a characteristic absorption at about 750 cm.$^{-1}$ which can be ascribed to the presence of the Mo-O-Mo group. The monomer products are identified by strong bands appearing as a triplet in the range 880–920 cm.$^{-1}$ of the I.R. spectrum, which bands can be correlated to the Mo═O group.

When employing the usual known oxidation catalysts, there usually also occurs, besides the polar process of the oxygen transfer, radical-type decomposition processes of the peroxidic compound with a loss of active oxygen. The extent of the radical type reaction depends upon the peroxide. This limits the use of the known catalysts to those cases in which this decomposition reaction may be considered negligible.

On the other hand, the molybdenum alkylene-dioxy-derivatives of the invention show no or substantially no catalytic activity towards radical-type reactions and, therefore, they are of wide application. The stability of the peroxides solutions in the presence of the molybdenum catalysts of the invention is a consequence of this.

The compounds of the present invention can all be obtained from a molybdenum compound in which oxygen atoms are directly attached to the molybdenum atom, e.g. molybdenum trioxide or from other molybdenum compounds, preferably organic compounds, by reaction with an organic derivative having vicinal hydroxyl groups, e.g. the vicinal alkylene glycols having from two to 12 carbon atoms in the molecule.

The products of the invention undergo prototropic phenomena and, therefore, the formulas I and II are not always correct as regards the position of the hydroxyl hydrogen.

When the diols contain at least one hydroxyl group of the tertiary type, the dimer (II) is directly obtained, but in other cases the monomer (I) is obtained. However each of the two types of product is transformable to the other, since the monomer (I) changes into the dimer (II) by dissolving the monomer in benzene and distilling, as an azeotropic mixture, the water formed upon condensation to the dimer; and by treating a dimer (II) with water in benzene the corresponding monomer (I) forms.

The preparation reaction of the compounds according to the present invention generally takes place at temperatures of from −20° to +110° C., preferably from 30° to 70° C.

As solvents for the reaction, use can be made of the reagents themselves or hydrocarbon-type inert solvents, either alone or in admixture with higher alcohols.

The following examples illustrate the present invention.

EXAMPLE 1

This Example describes the preparation of a molybdenum alkylene-dioxy-derivative having the formula II, where $R_1 = R_2 = H$, and $R_3 = R_4 = CH_3$.

12 g. of molybdenum acetylacetonate (W. Conard Fernelius, Kazuji Terada, and Burl E. Bryant, Inorganic Syntheses, 6, 147–148 (1960)) were dissolved in 20 g. of isobutylene glycol; the resulting solution was evaporated under vacuum to remove the excess glycol nearly to dryness; then 15 ml. of anhydrous benzene were added and the product was allowed to crystallize; it was filtered and washed with benzene. 11 g. of a product were obtained, which, when subjected to elementary analysis, showed the following results:

|   | Found | Theoretical |   |
|---|---|---|---|
| C | 32.30 | 32.30 | |
| H | 5.60 | 5.72 | M.P. = 107°–110° C. |

EXAMPLE 2

This example describes the preparation of a molybdenum alkylene-dioxy-derivative of the formula II type where $R_1 = R_2 = H$, and $R_3 = R_4 = CH_3$.

1 g. of $MoO_3$ was suspended in 10 ml. of isobutylene glycol and the suspension was kept at 80° C. for 10 hours. The undissolved molybdenum trioxide was filtered and recycled, and 780 mg. of the product were obtained from the solution as a residue.

The glycol which was collected and dried was recycled to a subsequent reaction.

EXAMPLE 3

This example describes the preparation of a molybdenum alkylene-dioxy-derivative of the formula I type where $R_1 = R_2 = R_3 = H$, and $R_4 = CH_3$.

The preparation was similar to the preparation described in Example 2 except for the use of propylene glycol instead of isobutylene glycol.

Analysis of the product gave these results:

|  | Found | Theoretical |
|---|---|---|
| C% | 26.51 | 25.90 |
| H% | 4.89 | 5.08 |

M.P. = 143° C.

EXAMPLE 4

Following the procedure described in Example 1, there was obtained from molybdenum acetylacetonate and 1-2-cyclohexanediol a molybdenum alkylene-dioxy derivative of the formula I type where $R_1 = R_4 = H$; and $R_2$ is combined with $R_3$ to form a 1,4 butylidene bi-radical, in quantitative yields. The product was separated from the unreacted excess glycol by dissolving the reaction mass in benzene. The compound crystallized from the solution with one molecule of solvent and had the formula:

$C_{12}H_{22}O_6Mo \cdot C_6H_6$: M.W. = 436;

Analysis:

|  | Found |
|---|---|
| C% | 48.93 |
| H% | 6.45 |

M.P. = 188°–190° C., with decomposition.

EXAMPLE 5

This Example describes the preparation of a molybdenum alkylene-dioxy-derivative of the formula I type where $$R_1=R_4=\overset{O}{\overset{\|}{C}}-O-C_2H_5$$

and $R_2 = R_3 = H$.

12 g. of molybdenum acetylacetonate were completely dissolved with heating in 50 g. of racemic ethyl tartrate. Distillation was carried out under vacuum and 15 ml. of benzene and an excess of petroleum ether were added to the residue. 10 g. of a white crystalline product were crystallized. The product was analyzed as follows:

|  | Found | Theoretical |
|---|---|---|
| C% | 35.30 | 35.68 |
| H% | 4.9 | 4.83 |

What we claim is:

1. A process for preparing an organo-molybdenum compound represented by one of the following general formulas:

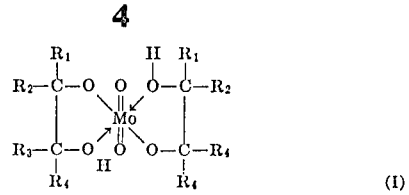

and

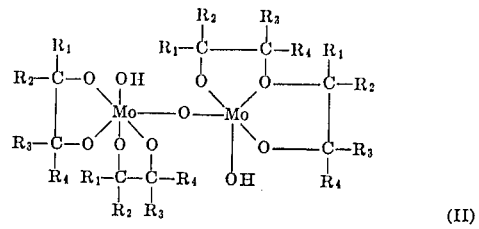

wherein each of $R_1$, $R_2$, $R_3$ and $R_4$, which may be the same or different, is a hydrogen atom, an unsubstituted or substituted hydrocarbon radical having from one to 10 carbon atoms, or a group having one of the formulas $$-\overset{O}{\overset{\|}{C}}-R$$

—COOR, —CN, —CONH$_2$, and NO$_2$, where R is a hydrocarbon radical having from one to 10 carbon atoms, or where $R_1$ and $R_4$, and/or $R_2$ and $R_3$ may form a bivalent hydrocarbon radical, which comprises reacting molybdenum acetylacetonate, with an organic derivative having vicinal hydroxyl groups so as to prepare the desired compound.

2. Process according to claim 1, wherein the organic derivative is a vicinal alkylene glycol having from two to 12 carbon atoms.

3. Process according to claim 1, wherein the reaction is carried out at a temperature in the range of from −20° to +110° C.

4. Process according to claim 3, wherein the reaction is carried out at a temperature in the range of from 30° to 70° C.

5. Process according to claim 1, wherein the reaction is carried out in presence of a hydrocarbon solvent or a mixture of the same with a higher alcohol.

6. Process according to claim 1, wherein, when a compound of formula I is formed, it is dissolved in benzene and water is distilled off so as to form the corresponding compound of formula II.

7. Process according to claim 1, wherein, when a compound of formula II is formed, it is treated with water and benzene so as to form the corresponding compound of formula I.

* * * * *

PO-1050
(5/69)

UNITED STATES PATENT OFFICE
CERTIFICATE OF CORRECTION

Patent No. 3,668,227     Dated June 6, 1972

Inventor(s) Anna Maria Mattucci and Emilio Perrotti

It is certified that error appears in the above-identified patent and that said Letters Patent are hereby corrected as shown below:

Column 1, line 37, in the formula after "—C—R" insert -- ,—COOR, —CN, —CONH$_2$, -- line 72, insert a double bond (=) between "Mo" and "O".

Column 4, correct formula "I" as follows:

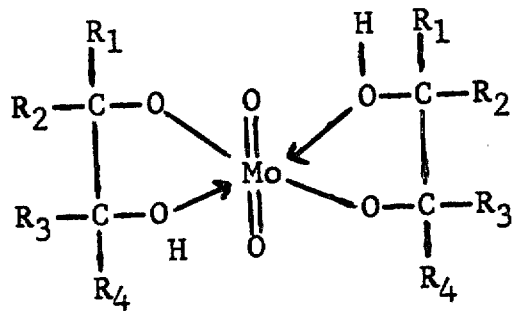

Signed and sealed this 19th day of February 1974.

(SEAL)
Attest:

EDWARD M. FLETCHER, JR.
Attesting Officer

C. MARSHALL DANN
Commissioner of Patents